United States Patent [19]

Nakashima et al.

[11] Patent Number: 5,282,908
[45] Date of Patent: Feb. 1, 1994

[54] HIGH STRENGTH α BRASS CONTAINING MN, SI, CO, FE, SN AND PB

[75] Inventors: Kunio Nakashima; Takayuki Tanaka; Wataru Yago; Kenzo Yamamoto; Ken-ichi Ichida, all of Toyama, Japan

[73] Assignee: Chuetsu Metal Works Co., Ltd., Toyama, Japan

[21] Appl. No.: 970,820

[22] Filed: Nov. 3, 1992

[51] Int. Cl.$^5$ ............................................. C22C 9/00
[52] U.S. Cl. .................................. 148/434; 420/477; 420/480
[58] Field of Search ................... 148/434; 420/477, 480

[56] References Cited

U.S. PATENT DOCUMENTS

| | | | |
|---|---|---|---|
| Re. 17,631 | 4/1930 | Lytle | 420/477 |
| 4,242,131 | 12/1980 | Shapiro et al. | 148/434 |
| 5,183,637 | 2/1993 | Tanaka et al. | 420/480 |

FOREIGN PATENT DOCUMENTS 0076143 5/1982 Japan .................................. 148/434

Primary Examiner—Upendra Roy
Attorney, Agent, or Firm—Flynn, Thiel, Boutell & Tanis

[57] ABSTRACT

A Mn-Si-Co-Fe-based high-strength brass alloy comprises, on the weight basis, 15 to 25% of Zn, 1.0 to 5.0% of Mn, 0.3 to 2.0% of Si, 0.01 to 0.5% of Fe, 0.01 to 2.0% of Co, 0.2 to 1.0% of Sn, 5 to 10% of Pb and the balance being Cu and inevitable impurities. The alloy has a novel intermetallic compound [Mn,Si,Co,Fe] substantially in the form of spheroids and has also fine grains. The alloy is adapted for use as sliding members or parts and has very good resistances to wear and corrosion, anti-seizing property and durability.

3 Claims, 16 Drawing Sheets uniform fine equiaxed crystal columnar crystal equiaxed crystal Crystal Form: Spheroid 1: Pb (black spots in Fig. 3(a))
2: Crystals Mn,Si,Co,Fe (grey regions in Fig. 3(a))
3: Matrix Crystal Form: Needle 1: Pb (black spots in Fig. 4(a)
2: Crystals $(Mn_5Si_3)$
   (grey regions in Fig. 4(a))
3: Matrix Crystal Form:   Needle 1: Crystals [Mn$_5$Si$_3$]
 (grey regions in Fig. 5(a))

(white spots in Photograph (a))

(white spots in Photograph (a))

Secondary electron image (Magnifications: x 1000)

Cu Lα Characteristic X-ray Image (Cu: white portions)

(Magnifications: x 1000)

Zn Lα Characteristic X-ray Image (Zn: white portions)

(Magnifications: x 1000)

Pb Mα Chracteristic X-ray Image (Pb: white portions)

(Magnifications: x 1000)

Mn Kα Characteristic X-ray Image (Mn: white portions)

(Magnifications: x 1000)

Si Kα Characteristic X-ray Image (Si: white portions)

(Magnifications: x 1000)

Sn Lα Characteristic X-ray Image (Sn: white portions)

(Magnifications: x 1000)

Fe Kα Characteristic X-ray Image (Fe: white portions)

(Magnifications: x 1000)

Co Kα Characteristic X-ray Image (Co: white portions)

(Magnifications: x 1000)

Illustrative View of Fig. 8

Crystals: Novel Intermetallic Compound (Mn, Si, Co, Fe)
Spheroidal in Form

Secondary Electron Image (Magnifications: x 1000)

Cu Lα Characteristic X-ray Image (Cu: white portions)

(Magnifications: x 1000)

Zn Lα Characteristic X-ray Image (Zn: white portions)

(Magnifications: x 1000)

Pb Mα Characteristic X-ray Image (Pb: white portions)

(Magnifications: x 1000)

Mn Kα Characteristic X-ray Image (Mn: white portions)

(Magnifications: x 1000)

Si Kα Characteristic X-ray Image (Si: white portions)

(Magnifications: x 1000)

Illustrative View of Fig. 18

Crystals: Intermetallic Compound [$Mn_5Si_3$] Needle-shaped

No. 3 Alloy

Corroded Layer (2.0 μm)

(Magnifications: × 400)

No. 14 Alloy

Corroded Layer (3.5 μm)

(Magnifications: × 400)

No. 9 Alloy

Corroded Layer (7.5 μm)

(Magnifications: × 400)

No. 3 Alloy (Magnifications: x 200)

Dezincified Layer (12 μm)

No. 14 Alloy (Magnifications: x 200)

Dezincified Layer (90 μm)

No. 8 Alloy (Maginifications: x 200)

Dezincified Layer (73 μm)

HIGH STRENGTH α BRASS CONTAINING MN, SI, CO, FE, SN AND PB

BACKGROUND OF THE INVENTION

1. Field of The Invention

This invention relates to Mn-Si-Co-Fe-based high-strength brass alloys for sliding members wherein substantially spheroidal crystals of a novel intermetallic compound [Mn,Si,Co,Fe] are formed. The brass alloys have utility in the fields of engine parts, transmission parts, hydraulic parts and vessel parts which are usually employed under severe conditions such as of high temperature and high-speed revolutions, high load and corrosive environments and should have good resistances to wear, seizing and corrosion and also good durability.

2. Description of The Prior Art

As is known in the art, manganese silicide-based high-strength brass castings have been widely used as a sliding member under moderate or high speed conditions or under high load. The wear resistance of this type of alloy relies greatly on the crystals of an intermetallic compound ($Mn_5Si_3$). In order to improve the seizing resistance of the manganese silicide-based high-strength brass alloy, there has been proposed a high-strength brass alloy having a low wear resistance and a good seizing resistance wherein Pb is added in large amounts (Japanese Laid-open Patent Application No. 56-11735). For this purpose, there are also used lead bronze alloys such as JIS H5115, LBC-3, LBC-4 and the like.

In recent years, however, manganese silicide-based high-strength brass alloys have been employed in a corrosive environment under sliding conditions with advanced speed and load. Known alloys are not satisfactory with respect to the wear resistance and the durability. This is because the alloys include a crystallized intermetallic compound ($Mn_5Si_3$) whose shape is substantially in the form of needles as is particularly shown in FIGS. 4, 5 and 24 and the grains formed at the time of casting are coarse as shown in FIG. 2. Pb is an element which contributes to the improvement of an anti-seizing property and machinability. However, since the known alloys have such crystal structure as set out hereinabove, Pb added in large amounts cannot be uniformly distributed, with the anti-seizing property being not satisfactory. In addition, the alloys have a serious problem on the durability owing to the repeated fatigue during use, coupled with another disadvantage that the known alloys are poor in the corrosion resistance against sea water.

Thus, known manganese silicide-based high-strength brass alloys have not been considered satisfactory with respect to properties when employed, as engine parts, transmission parts, hydraulic parts and vessel parts, under severe conditions such as of high temperature and high speed revolutions, high load and corrosive environment where good wear resistance, anti-seizing property, corrosion resistance and durability are required.

On the other hand, LBC-3 or LBC-4 which is a kind of lead bronze alloy has a good anti-seizing property but is unsatisfactory with respect to the wear resistance. Another problem is that the alloy reacts with lubricating oils, causing corrosion to proceed considerably. Like manganese silicide-based high-strength brass castings, the lead bronze alloys have coarse grains, thus presenting a problem on the durability.

SUMMARY OF THE INVENTION

It is accordingly an object of the invention to provide a Mn-Si-Co-Fe-based high-strength brass alloy which is adapted for use as sliding members or parts in various fields and which overcomes the drawbacks of prior manganese silicide high-strength brass alloys and lead bronze alloys.

It is another object of the invention to provide a Mn-Si-Co-Fe-based high-strength brass alloy which comprises a novel intermetallic compound crystallized substantially in a spheroidal form whereby the alloy has very good resistances to wear and corrosion, anti-seizing property and durability.

The above objects can be achieved, according to the invention, by a manganese silicide-based high-strength brass alloy which comprises, on the weight basis, 15 to 25% of Zn, 1.0 to 5.0% of Mn, 0.3 to 2.0% of Si, 0.01 to 0.5% of Fe, 0.01 to 2.0% of Co, 0.2 to 1.0% of Sn, 5 to 10% of Pb and the balance being Cu and inevitable impurities wherein a substantially spheroidized intermetallic compound [Mn,Si,Co,Fe] is crystallized in the alloy and the alloy has fine grains. Preferably, the grain size is 0.5 mm or below.

In order to uniformly distribute a large amount of Pb in the matrix and to improve the anti-seizing property, we have considered it necessary that an intermetallic compound ($Mn_5Si_3$) formed as crystals in known manganese silicide-based high-strength brass alloys is converted to a different type of intermetallic compound. The invention is based on the finding that when Fe and Co are added as essential components, a novel intermetallic compound [Mn,Si,Co,Fe] is crystallized, in place of needle-shaped crystals of the known manganese silicide (Mn-Si), in the form of spheroids presumably by the synergistic effect of both Fe and Co. It has been also found that to improve the corrosion resistance in oils and sea water, Sn is essential.

BRIEF DESCRIPTION OF THE DRAWINGS

FIGS. 26(a) to 26(c) are, respectively, a sectional micro-structure of an alloy subjected to a high temperature immersion test in an oil wherein FIG. 26(a) is a photograph of a micro-structure of Alloy No. 3, FIG. 26(b) is a photograph of a micro-structure of Alloy No. 14, and FIG. 26(c) is a photograph of a micro-structure of Alloy No. 9; and FIGS. 27(a) to 27(c) are, respectively, a section micro-structure of an alloy subjected to a dezincification corrosion test wherein FIG. 27(a) is a photograph of a micro-structure of Alloy No. 3, FIG. 27(b) is a photograph of a micro-structure of Alloy No. 14, and FIG. 27(c) is a photograph of a micro-structure of Alloy No. 8.

DETAILED DESCRIPTION AND EMBODIMENTS OF THE INVENTION

Figure 1A:
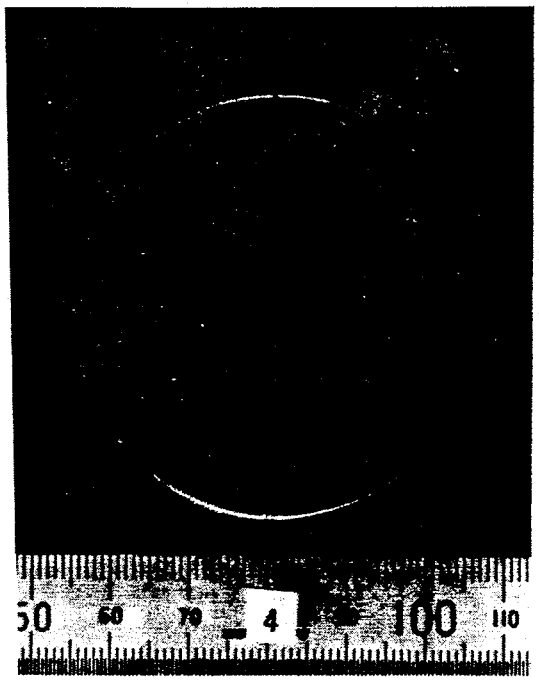
FIGS. 1(a) and 1(b) are, respectively, a photograph showing the macro-structure of Alloy No. 3 of example of the invention and an illustrative view depicting the essential part of the structure.

The reasons why the amounts of the respective components are used in the ranges defined hereinabove are described wherein percent is by weight.

1) Zn

Zn is an element which imparts strength and toughness to the alloy and determines a matrix structure of the alloy. If the content of Zn is less than 15%, satisfactory strength cannot be obtained. The α phase contributes to the improvement of high temperature strength and the dendrite structure of the α phase enables Lubricating Pb to be uniformly dispersed in large amounts. Accordingly, the content of Zn should be not higher than 25%. When the content exceeds 25%, the β phase appears, bringing about not only a lowering of high temperature strength, but also a lowering of the corrosion resistance. In addition, since the dendrite structure of the α phase is decreased, the uniform dispersion of Pb is adversely influenced. Thus, the content of Zn is in the range of from 15 to 25%.

2) Mn

Mn is an element which can improve mechanical properties of the alloy matrix and which is necessary for crystallizing the intermetallic compound (Mn,Si,Co,Fe), with which the wear resistance is significantly improved. When the content of Mn is less than 1.0%, the formation of the crystals of the intermetallic compound (Mn,Si,Co,Fe) is reduced to an extreme extent. On the other hand, when the content exceeds 5.0%, the improving effect is saturated and the toughness of the resultant alloy is lowered. Thus, the content is in the range of from 1.0 to 5.0%.

3) Si

Si is an element which is essential for the crystallization of the intermetallic compound (Mn,Si,Co,Fe) along with Mn, Fe and Co. If the content of Si is less than 0.3%, the crystallization of the intermetallic compound (Mn,Si,Co,Fe) is reduced to an extreme extent. If the content of Si exceeds 2.0%, the toughness of the resultant alloy is lowered. Accordingly, the content is in the range of from 0.3 to 2.0%.

4) Pb

Pb is effective in improving the anti-seizing property and also the machinability. If the content of Pb is less than 5%, the improving effect does not become significant under high temperature, high speed and high load sliding conditions. On the other hand, when the content exceeds 10%, Pb in the matrix cannot be uniformly dispersed, so that a greater effect cannot be obtained as will be expected from the content and the strength is considerably lowered. Accordingly the content of Pb is in the range of from 5 to 10%.

5) Fe

Fe constitutes a novel intermetallic compound (Mn,Si,Co,Fe) along with Mn, Si and Co and contributes to the improvement of the wear resistance. The uniform distribution of Pb is greatly influenced by the properties of grains and the alloy of the invention should have fine grains. Both Fe and Co facilitate fineness of the grains and contribute to the uniform distribution of Pb. However, if the content of Fe is less than 0.01%, the above effect cannot be expected. When the content exceeds 0.5%, any further effect is not expected but segregation of the novel intermetallic compound [Mn,Si,Co,Fe] takes place. Accordingly, the content is in the range of 0.01 to 0.5%.

6) Sn

Sn facilitate the development of the dendrite structure in the $\alpha$ phase, permitting Pb to be more uniformly distributed. In addition, this element can improve the corrosion resistance. If the content of Sn is less than 0.2%, the above effect cannot be expected. Over 1.0%, any further effect is not expected. The content is in the range of from 0.2 to 1.0%.

7) Co

Co combines with Mn, Si and Fe to cause the novel intermetallic compound (Mn,Si,Co,Fe) to crystallize substantially in the form of spheroids as set out above, thereby remarkably improving the wear resistance. In addition, Co is very effective in making a fine matrix structure (grain size: 0.5 mm or below) and contributes to the remarkable improvement of a repeated fatigue characteristic. Thus, Co is a very important element which improves the properties of the alloy for use as a sliding member. When the content of Co is less than 0.01%, the above effect cannot be expected satisfactorily. When the content exceeds 2.0%, any further effect is not obtained as will be expected from the content. Accordingly, the content of Co is in the range of from 0.01 to 2.0%.

Figure 4A:
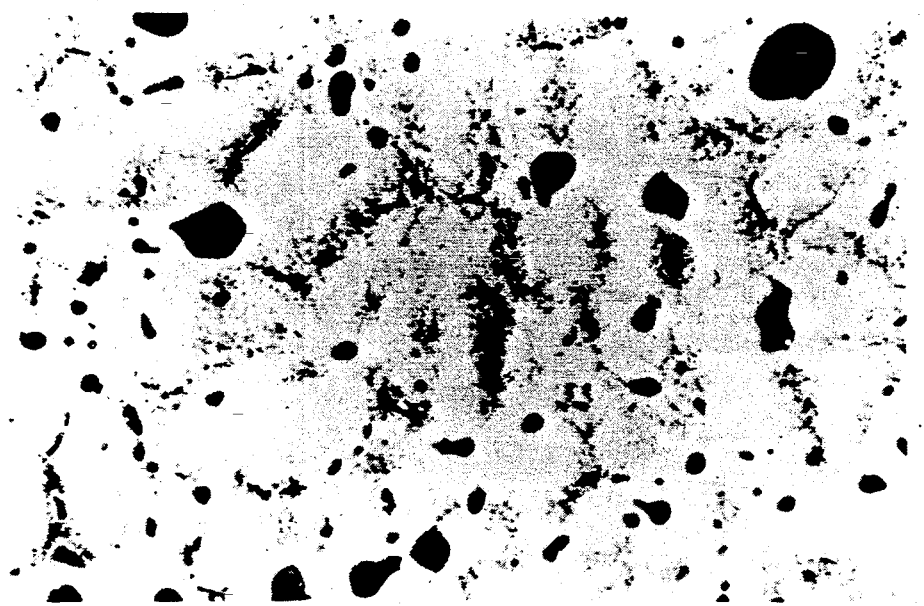
FIGS. 4(a) and 4(b) are, respectively, a photograph and an illustrative view of Alloy No. 14 of comparative example, corresponding to FIGS. 3(a) and 3(b)
Figure 4B:
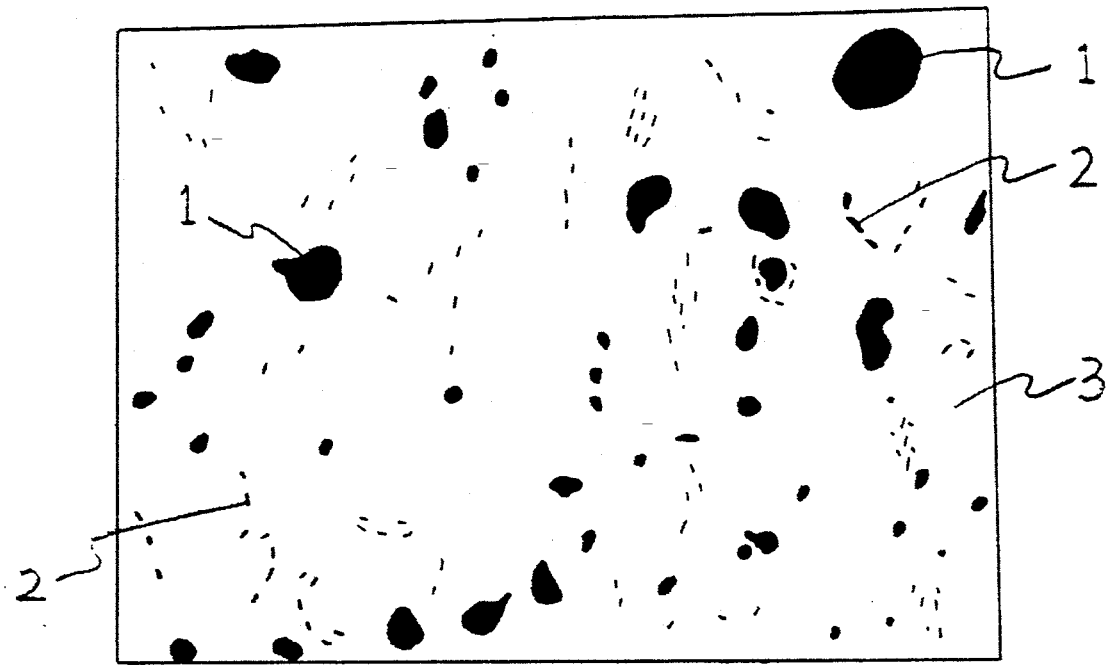
Figure 5A:
FIGS. 5(a) and 5(b) are, respectively, a photograph showing the micro-structure of Alloy No. 8 and an illustrative view depicting the essential part of the structure.
Figure 17:
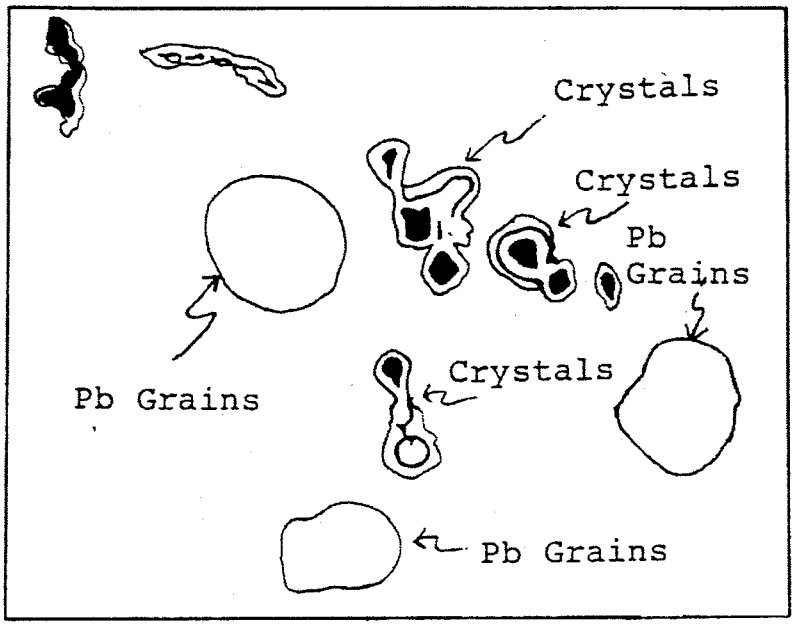
FIG. 17 is an illustrative view depicting the essential part of FIG. 8.

The intermetallic compound [$Mn_5Si_3$] in known manganese silicide high-strength brass alloys has an atomic ratio of $Mn:Si \approx 5:3$ and is crystallized substantially in the form of needles as is particularly shown in FIGS. 4 and 5. The copper alloy of the invention comprises Co and Fe by which a novel intermetallic compound [Mn,Si,Co,Fe] in a spheroidal form, whose atomic ratios are $Mn:Si:Co:Fe \approx 15:29:25:31$, is crystallized as is shown in FIGS. 3 and 17. By this, the wear resistance is improved. At the same time, the alloy has a fine grain structure as is shown in FIG. 1, which contributes to the significant improvement of durability during use.

The fineness of the grains in the alloy not only contributes to the improvement of the durability, but also to uniformity in the distribution of Pb added in large amounts. This is particularly shown in FIG. 6. As stated hereinbefore, the uniform distribution of Pb is greatly influenced by the properties or size of the grains and is achieved when fine grains are formed. At the time of solidification, known manganese silicide high-strength brass alloys inevitably involve a significant difference in grain size as is shown in FIG. 2. This undesirably leads to a non-uniform distribution of Pb as shown in FIG. 7. This is overcome by the invention wherein the alloy of the invention has such a composition that fine grains are crystallized. As shown in FIG. 6, the alloy of the invention has Pb uniformly distributed from the periphery to the central portion of the sample.

The alloy of the invention is imparted with a stable anti-seizing property. Since Pb is contained in large amounts in the dendrite structure of the $\alpha$ phase, the anti-seizing property is significantly improved. In addition, Fe and Co are added to the alloy, so that Pb can be more uniformly dispersed, thereby further improving the anti-seizing property. The addition of Sn contributes to the improvement of the corrosion resistance.

The invention is more particularly described by way of examples.

EXAMPLE

Copper alloy Nos. 1 to 7 of the invention and copper alloy Nos. 8 to 14 for comparison having chemical formulations indicated in the attached Table 1 were prepared by melting the respective metal components in a high frequency induction furnace having a frequency of 3 KHz, a maximum output of 100 KW and a maximum melt weight of 100 kg. The individual melts were cast into a sample mold of JIS H5113E and a cast iron sample mold with a size of $\phi55 \times 100$ in length thereby obtaining samples. The high temperature mechanical properties (tensile strength, elongation and hardness) of the respective alloys at 300° C. are also shown in the attached Table 1.

The alloy structure and the Pb distribution in the alloy are shown in FIGS. 1 to 7 with respect to the inventive copper alloy No. 3 and comparative copper alloy Nos. 14 and 8.

Figure 1B:
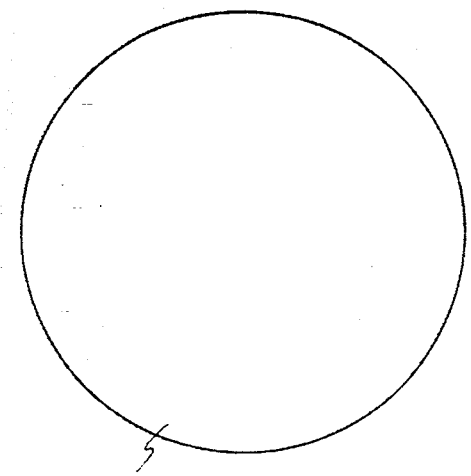

FIG. 1 shows a macro-structure of the inventive alloy No. 3 wherein FIG. 1(a) is a photograph and FIG. 1(b) diagrammatically shows the essential part of the structure.

The photograph of the micro-structure in FIG. 1(a) was taken for the following purpose. The cross section of an alloy sample was mirror finished by buffing and etched with a ferric chloride-hydrochloric acid solution, and the photograph was taken for the purpose of visual observation of the macro-structure.

For convenience' sake, FIG. 1(b) illustrates the macro-structure while omitting a fine equiaxed crystal with a size of about 0.2 mm which is uniformly and densely distributed over the entire cross section of the alloy.

Figure 2A:
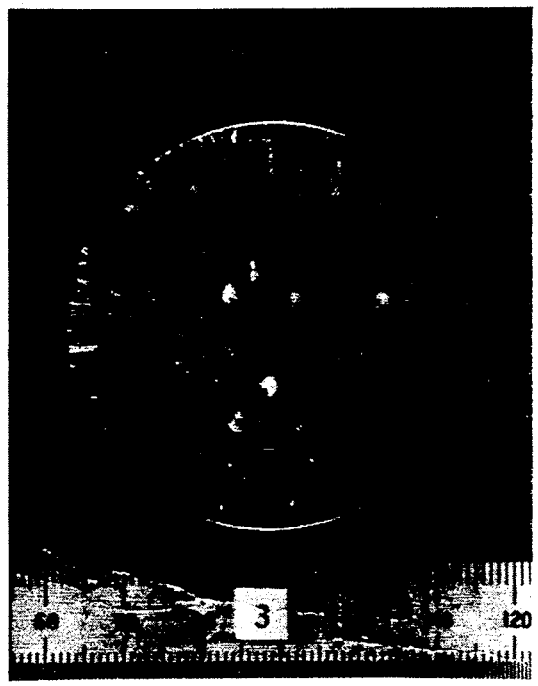
FIGS. 2(a) and 2(b) are, respectively, a photograph and an illustrative view of Alloy No. 14 of comparative example, corresponding to FIGS. 1(a) and 1(b)
Figure 2B:
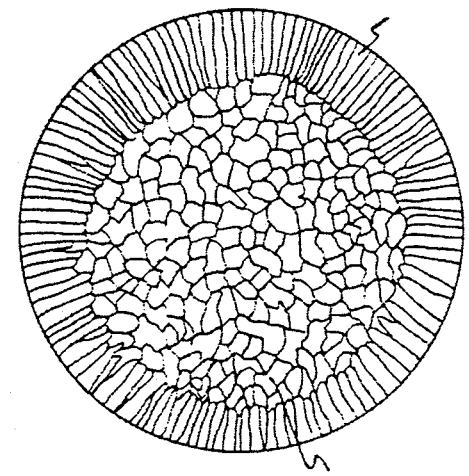

FIG. 2 shows the macro-structure of the comparative alloy No. 14 wherein FIG. 2(a) is a photograph and FIG. 2(b) is a diagrammatic view of the essential part thereof. From these figures, it will be seen that the comparative alloy No. 14 is a coarse grain alloy consisting of the equiaxed crystal and the columnar crystal whereas the inventive alloy No. 3 is an alloy consisting of fine grains.

Then, the samples of the alloy Nos. 3, 8 and 14 were each mirror finished at the section thereof by means of a buffing machine, followed by etching with a ferric chloride-hydrochloric acid corrosive solution and taking a photograph of the micro-structure at 400 magnifications.

Figure 3A:
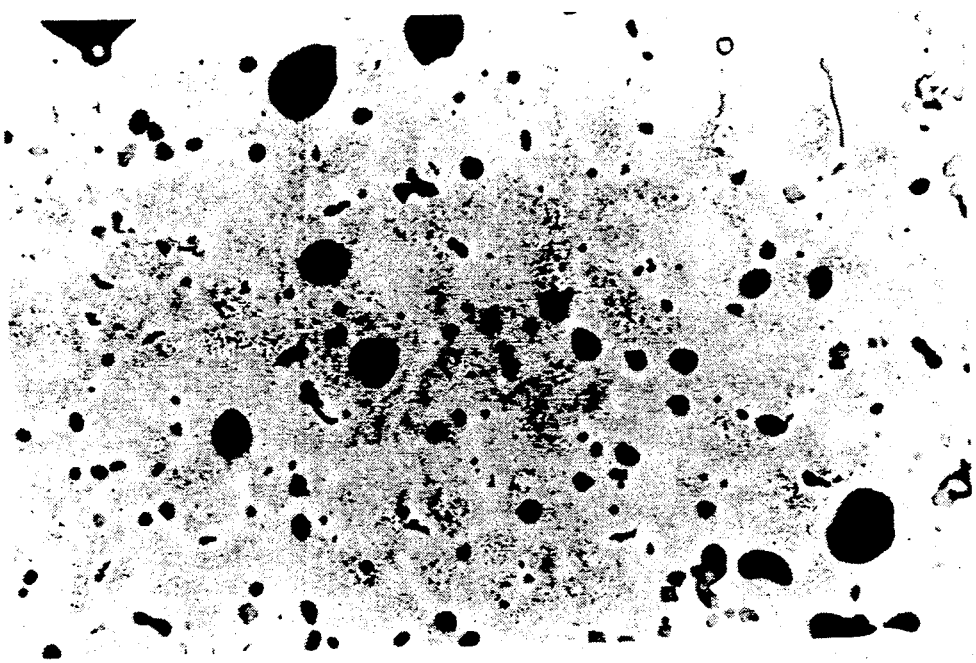
FIGS. 3(a) and 3(b) are, respectively, a photograph showing the micro-structure of Alloy No. 3 and an illustrative view depicting the essential part of the structure.
Figure 3B:
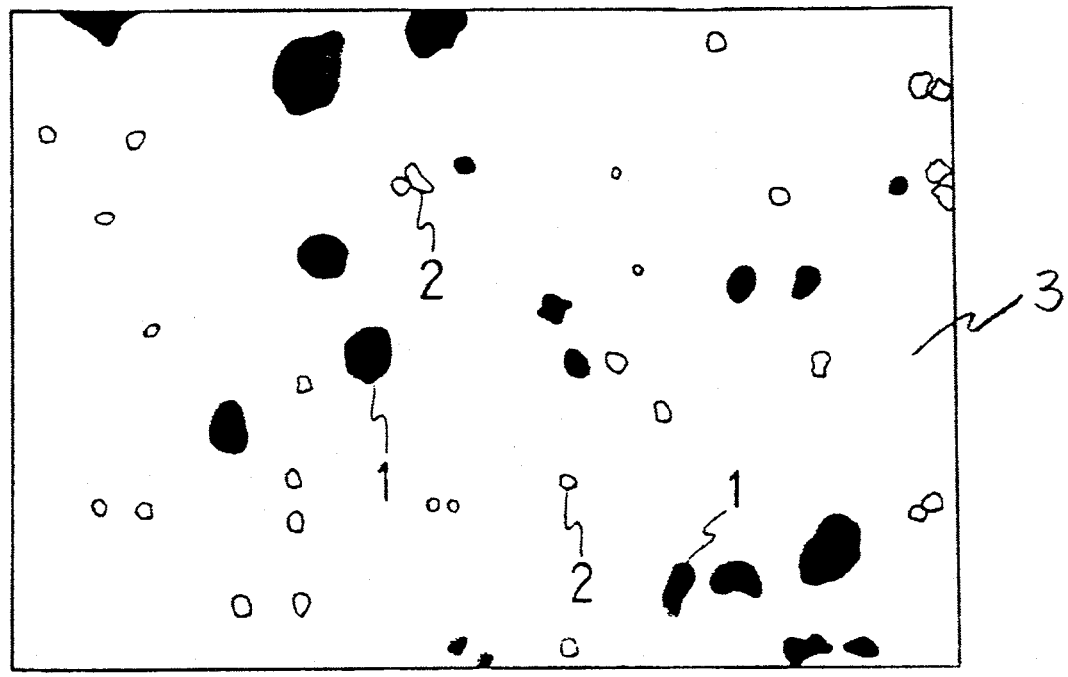
Figure 5B:
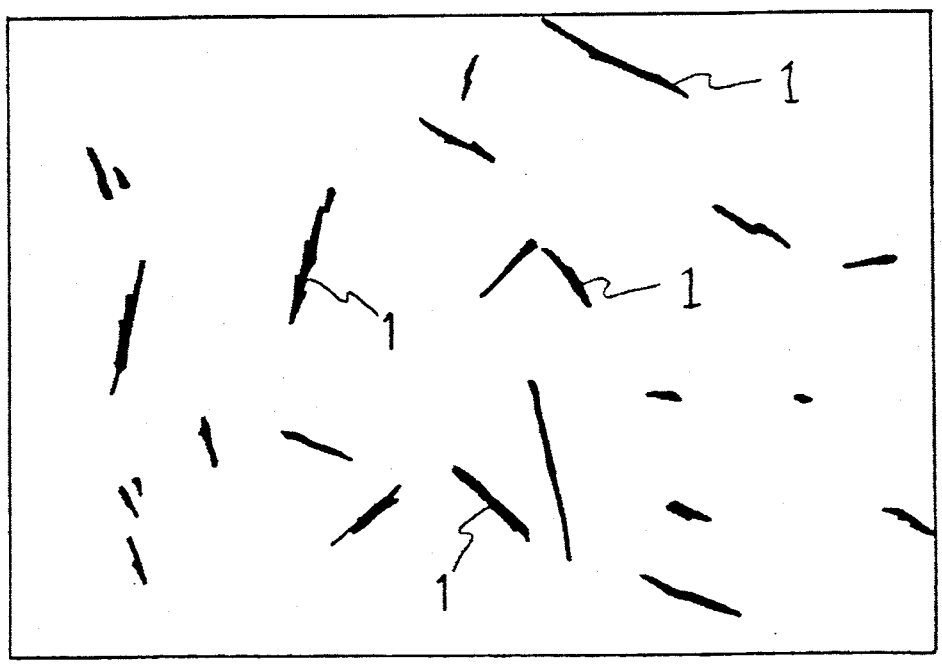

FIG. 3 shows a micro-structure of the inventive alloy No. 3 wherein FIG. 3(a) is a photograph and FIG. 3(b) is a diagrammatic view of the essential part of the micro-structure. FIGS. 4 and 5, respectively, show micro-structures of the alloy Nos. 14 and 8 wherein FIGS. 4(a) and 5(b) are, respectively, a photograph and FIGS. 4(b) and 5(b) are, respectively, a diagrammatic view of the essential part.

From these figures, it will be seen that the crystals [Mn,Si,Co,Fe] of the alloy No. 3 have a spheroidal form and those crystals [$Mn_5Si_3$] of the alloy Nos. 14 and 8 have a needle shape.

The crystals (intermetallic compound) of the alloy No. 3, the respective crystals (intermetallic compounds) of the alloy Nos. 8 and 14, and the intermetallic compound ($Mn_5Si_3$) of a known manganese silicide-based high-strength brass alloy were, respectively, subjected to qualitative analysis with the results shown below.

The qualitative analysis was carried out according to an energy dispersed spectral analysis (analyzer: Topkon's scanning-type electron microscope ECP-1, System 9100 available from EDAX Co., Ltd.). The results are shown in Table 2.

As will be apparent from Table 2, the intermetallic compounds of the comparative copper alloy Nos. 8 and 14 are very coincident with the intermetallic compound, (Mn5Si3) of the known manganese silicide-based high-strength brass alloy with respect to the atomic ratios by percent.

On the other hand, the atomic ratio of Mn and Si in the inventive copper alloy No. 3 is such that Mn:Si≈3:7. This is completely different from the atomic ratio of Mn:Si≈5:3 of the intermetallic compound (Mn5Si3) in the known manganese silicide-based copper alloy. Apparently, the novel intermetallic compound of the invention alloy is not such an intermetallic compound that Co and Fe merely combine with the known intermetallic compound (Mn5Si3).

More particularly, the intermetallic compound of the copper alloy according to the invention is a hitherto unknown intermetallic compound with consists of four elements of [Mn,Si,Co,Fe] with atomic ratios being Mn:Si:Co:Fe≈15:29:25:31. At present, to elucidate the crystal structure of the novel intermetallic compound involves a number of technical problems and is very difficult.

Figure 6A:
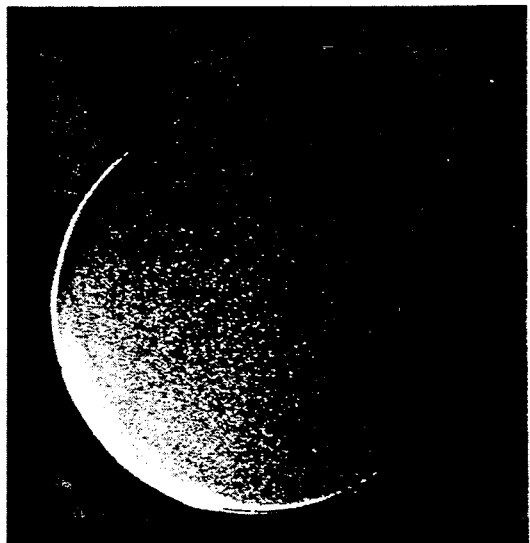
FIGS. 6(a) and 6(b) are, respectively, a photograph showing the distribution of Pb in Alloy No. 3 and an illustrating view depicting the essential part of the distribution.
Figure 6B:
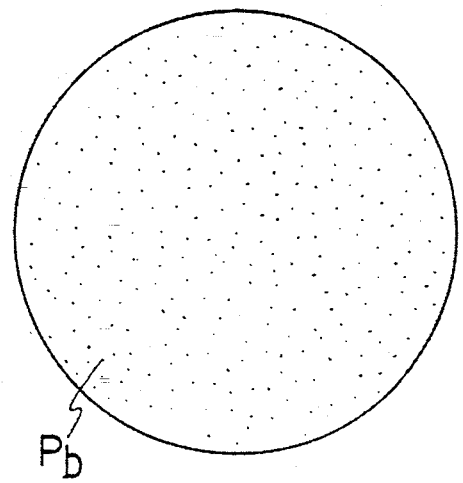

FIG. 6 shows a distribution of Pb in the alloy No. 3 wherein FIG. 6(a) is a photograph and FIG. 6(b) diagrammatically shows the essential part. FIG. 7 shows a distribution of Pb in the alloy No. 14 wherein FIG. 7(a) is a photograph and FIG. 7(b) diagrammatically shows the essential part.

Figure 7A:
FIGS. 7(a) and 7(b) are, respectively, a photograph and an illustrating view of Alloy No. 14 corresponding to FIGS. 6(a) and 6(b)
Figure 7B:
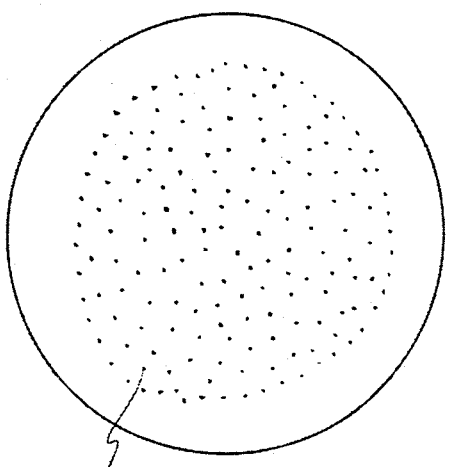

The photographs of FIGS. 6(a) and 7(a) are taken for the purpose of visual observation of the distribution of Pb after mirror finishing of the cross section of the respective samples by buffing. In the photographs, white spots indicate Pb. In FIGS. 6(b) and 7(b), Pb is depicted as black spots.

As will be apparent from FIGS. 6 and 7, Pb is uniformly distributed in the alloy No. 3, whereas Pb is segregated in the alloy No. 14 and is not thus uniformly distributed.

In general, the distribution of Pb differs depending on the form of crystal. With the alloy No. 3 having a uniform fine equiaxed crystal, the uniform distribution of Pb results as shown in FIG. 1. With the alloy No. 14 consisting of a mixed structure of the columnar crystal and the equiaxed crystal as shown in FIG. 2, the distribution of Pb becomes non-uniform.

Figure 8:
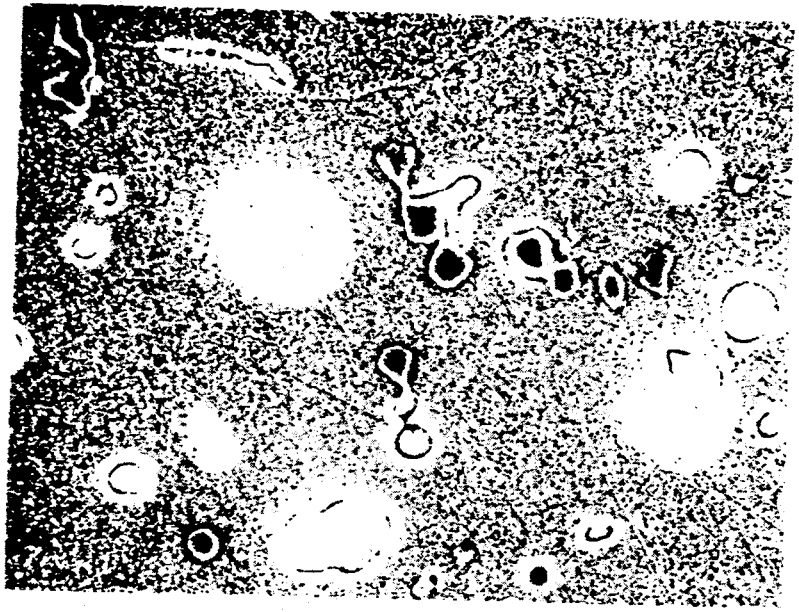
FIG. 8 is a photograph of a secondary electron image of Alloy No. 3, which is one of the results of electron probe microanalysis (EPMA)

FIGS. 8 to 16 shows photographs showing the results of electron probe microanalysis (EPMA) of the alloy No. 3. FIG. 8 shows a secondary electron image which is obtained from secondary electrons emitted from a test piece and FIG. 17 diagrammatically illustrates the essential part of the image.

Figure 9:
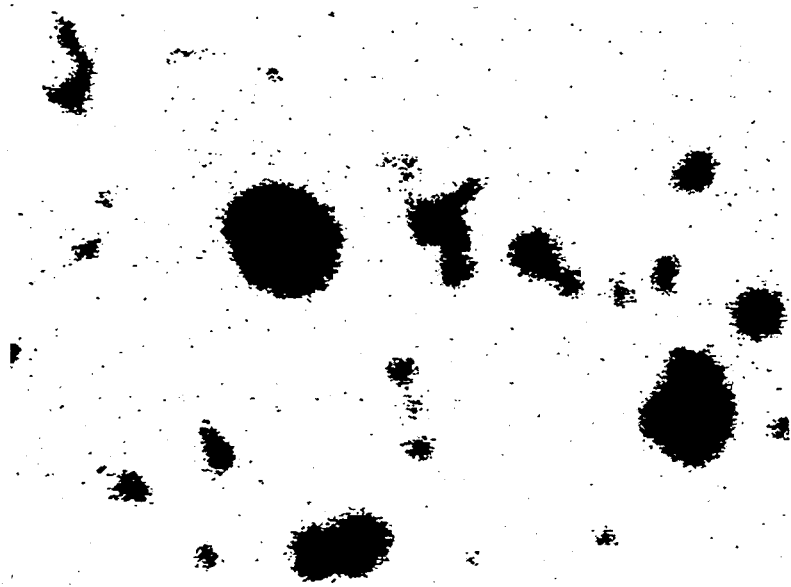
FIG. 9 is a photograph of a Cu Lα characteristic X-ray image of Alloy No. 3, which is one of the results of EPMA.
Figure 10:
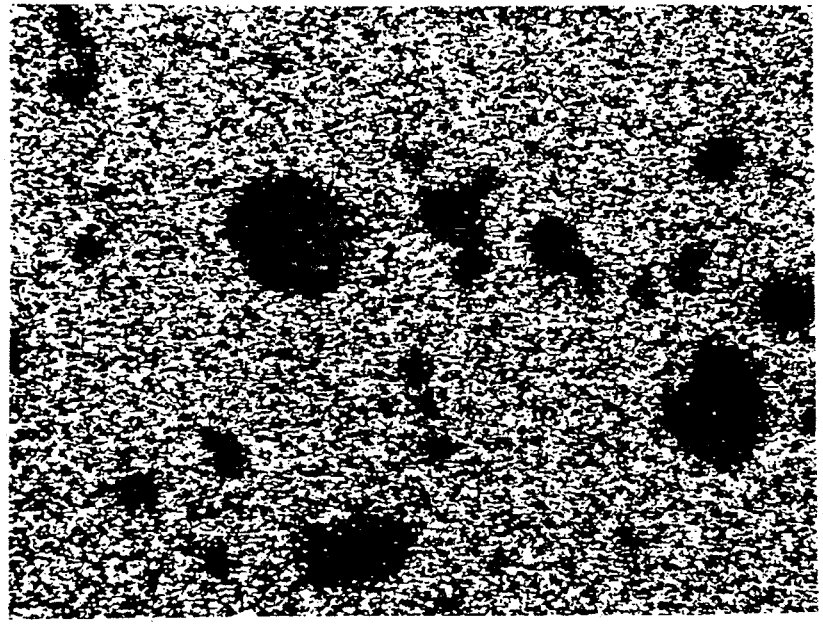
FIG. 10 is a photograph of a Zn Lα characteristic X-ray image of Alloy No. 3, which is one of the results of EPMA.
Figure 11:
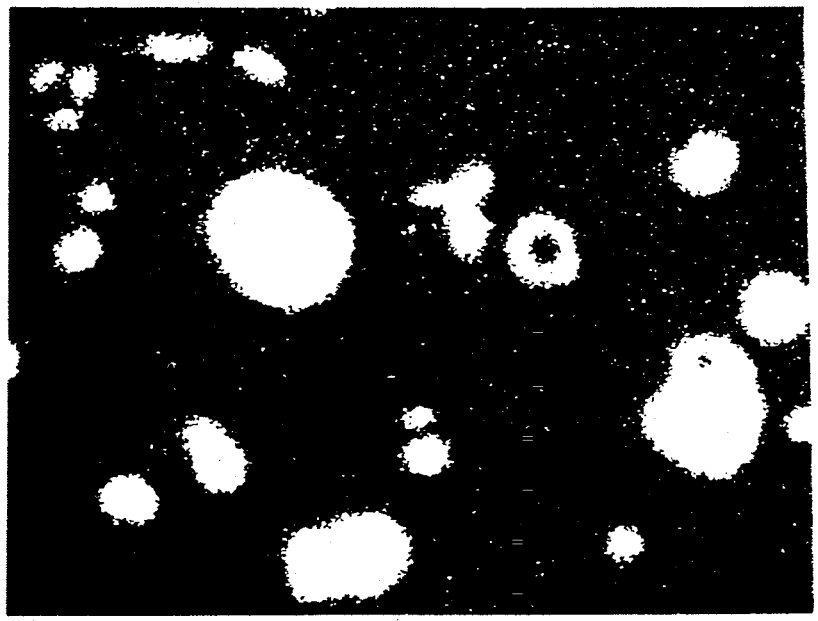
FIG. 11 is a photograph of a Pb Mα characteristic X-ray image of Alloy No. 3, which is one of the results of EPMA.
Figure 12:
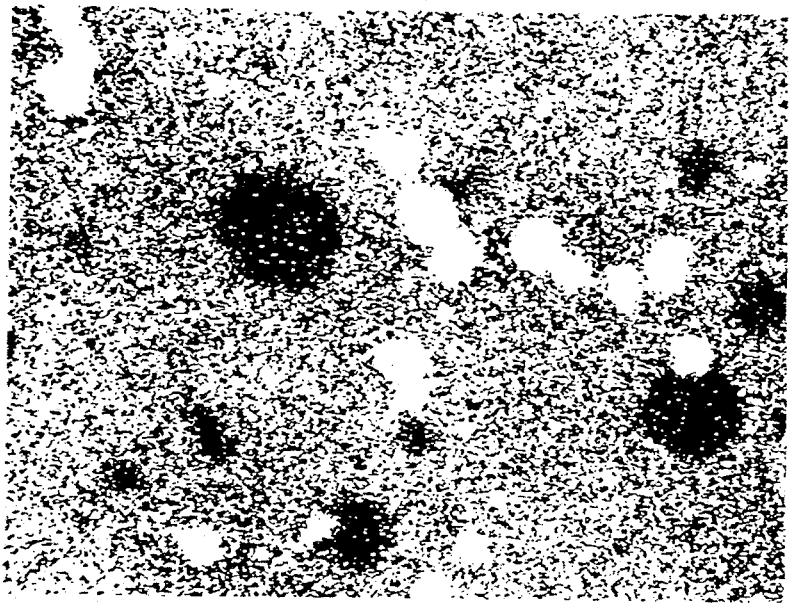
FIG. 12 is a photograph of a Mn Kα characteristic X-ray image of Alloy No. 3, which is one of the results of EPMA.
Figure 13:
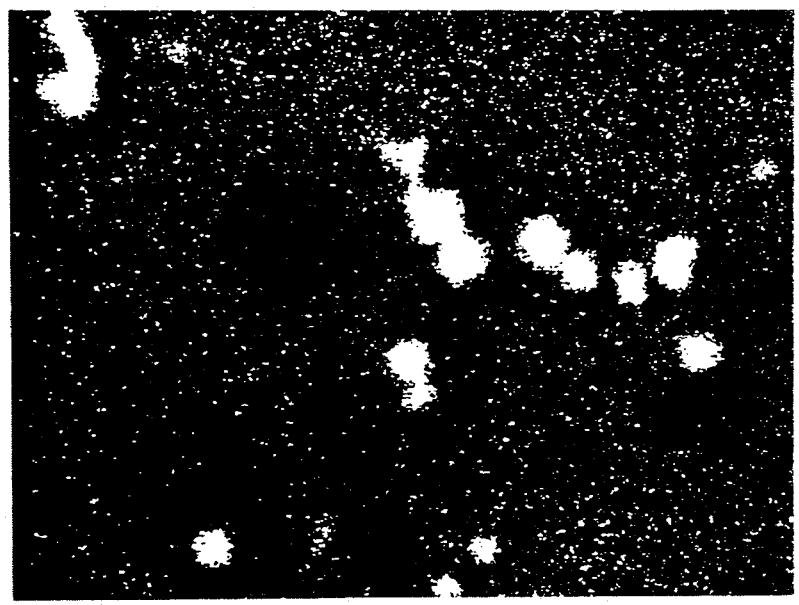
FIG. 13 is a photograph of a Si Kα characteristic X-ray image of Alloy No. 3, which is one of the results of EPMA.
Figure 14:
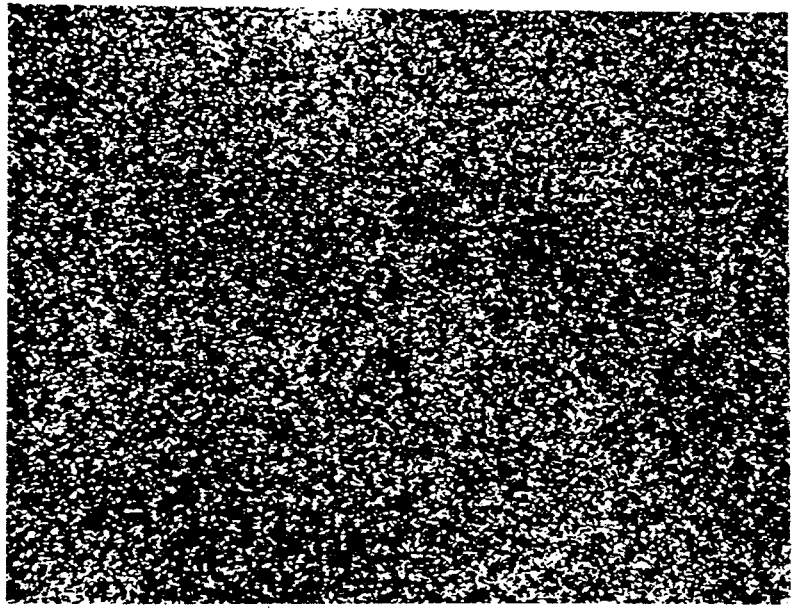
FIG. 14 is a photograph of a Sn Lα characteristic X-ray image of Alloy No. 3, which is one of the results of EPMA.
Figure 15:
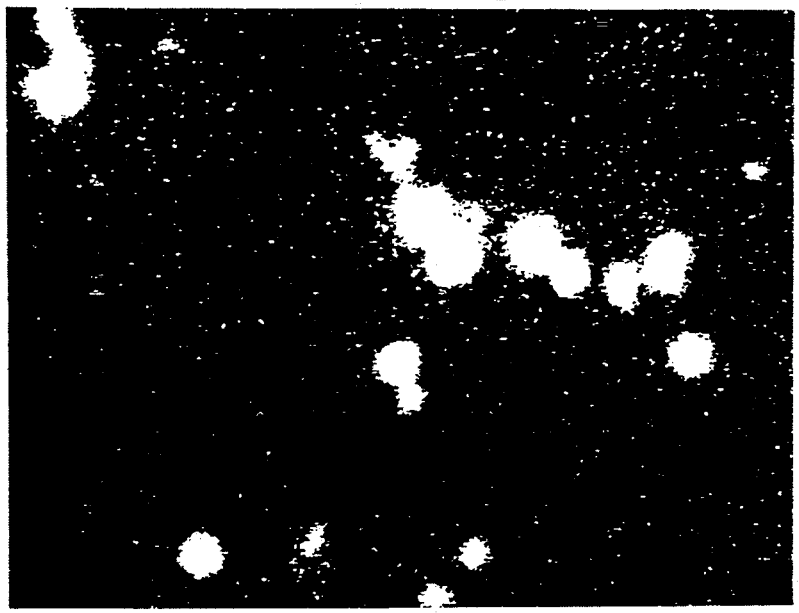
FIG. 15 is a photograph of a Fe Kα characteristic X-ray image of Alloy No. 3, which is one of the results of EPMA.
Figure 16:
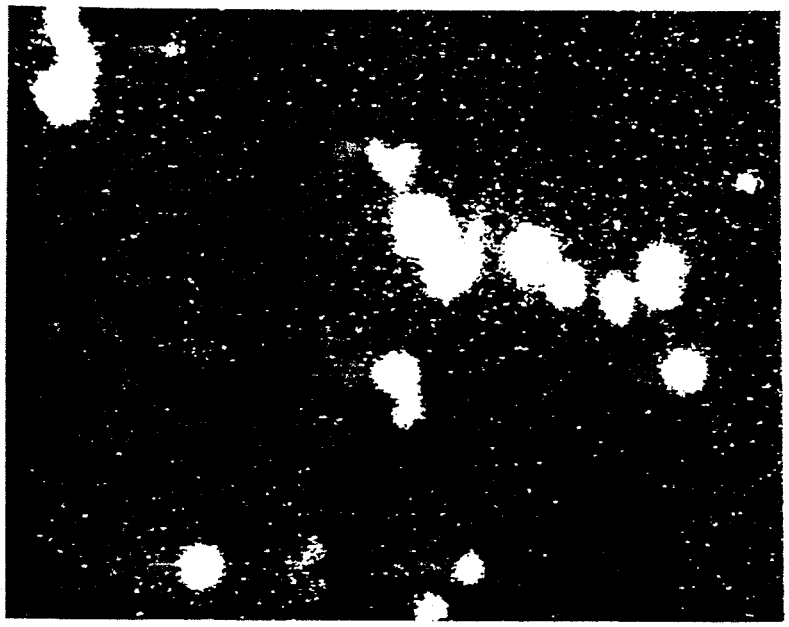
FIG. 16 is a photograph of a Cu Kα characteristic X-ray image of Alloy No. 3, which is one of the results of EPMA.

FIG. 9 show a photograph of a Cu Lα characteristic X-ray image of the alloy. When the Cu element is irradiated with an electron beam from an X-ray microanalyzer, an X-ray characteristic to the Cu element is emitted (characteristic X-ray). FIG. 9 is a photograph of a Cu Lα ray image, in which white portions indicate the existence of Cu.

FIGS. 10 to 16 are, respectively, photographs of images of a Zn Lα ray, a Pb Mα ray, a Mn Kα ray, a Si Kα ray, a Sn Lα ray, an Fe Kα ray, and a Co Kα ray. In the photographs, white portions indicate the respective elements.

Figure 18:
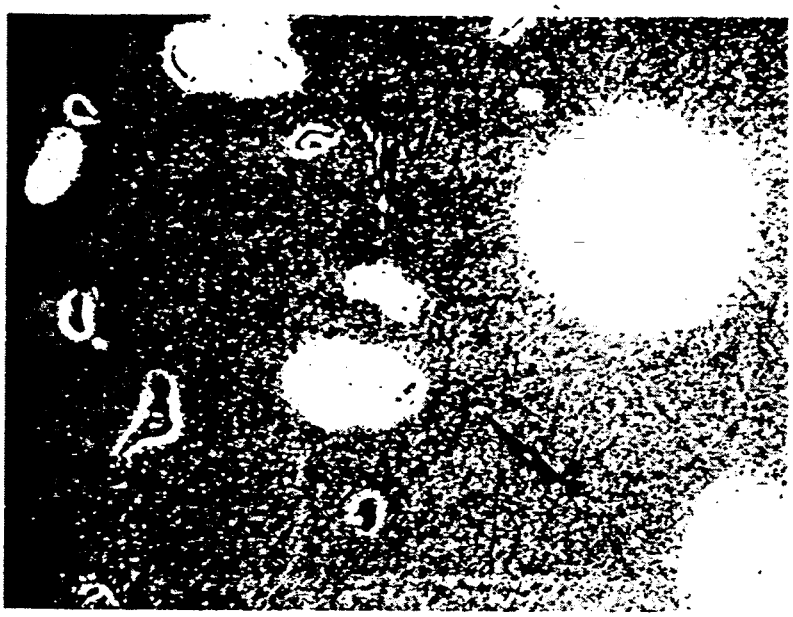
FIG. 18 is a photograph of a secondary electron image of Alloy No. 14, which is one of the results of EPMA.
Figure 19:
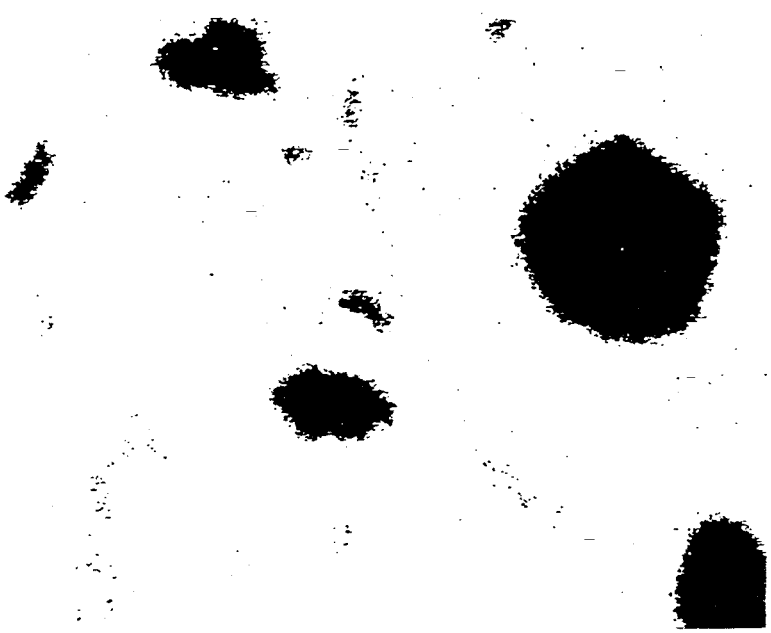
FIG. 19 is a photograph of a Cu Lα characteristic X-ray image of Alloy No. 14, which is one of the results of EPMA.
Figure 20:
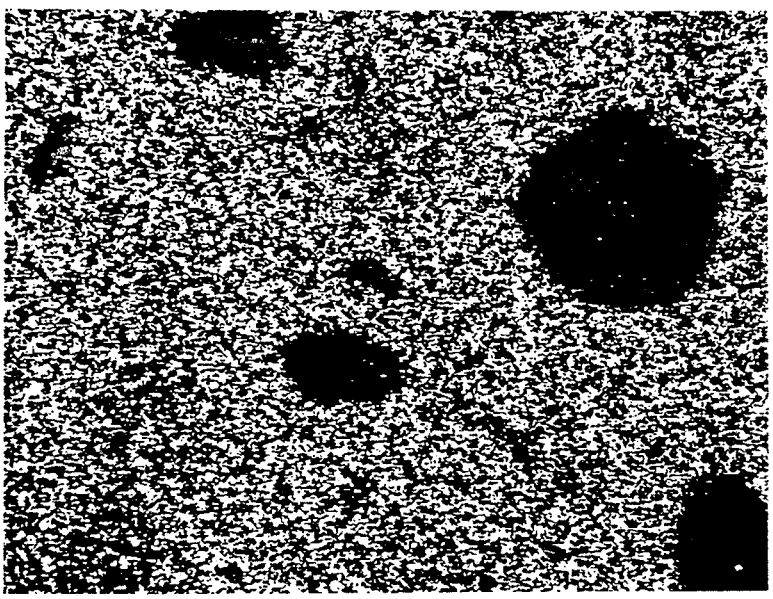
FIG. 20 is a photograph of a Zn Lα characteristic X-ray image of Alloy No. 14, which is one of the results of EPMA.
Figure 21:
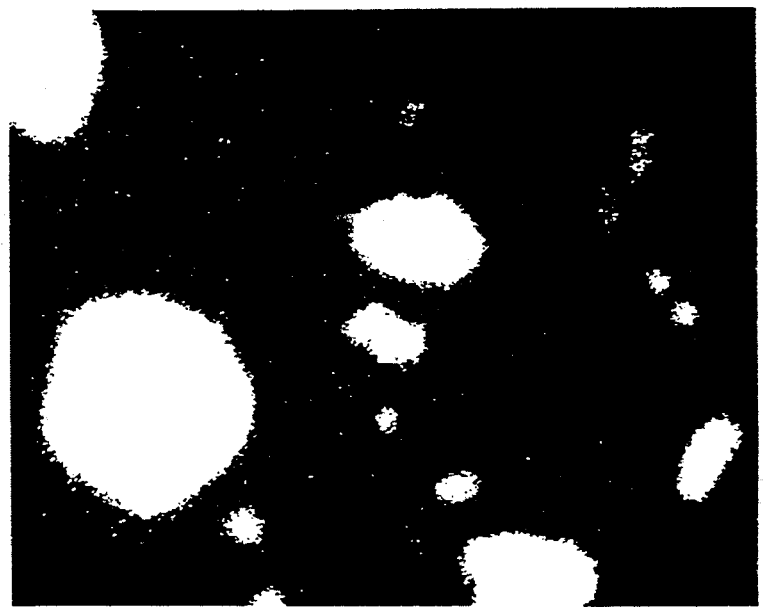
FIG. 21 is a photograph of a Pb Mα characteristic X-ray image of Alloy No. 14, which is one of the results of EPMA.
Figure 22:
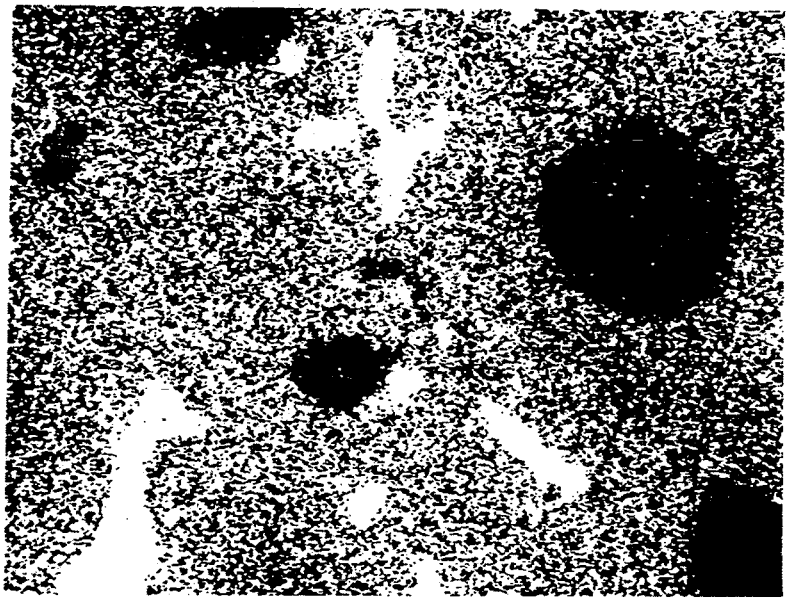
FIG. 22 is a photograph of a Mn Kα characteristic X-ray image of Alloy No. 14, which is one of the results of EPMA.
Figure 23:
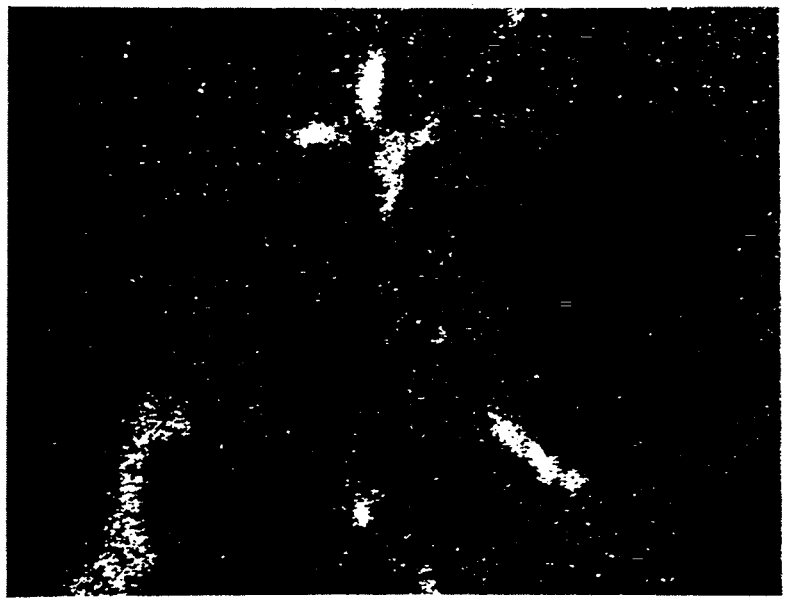
FIG. 23 is a photograph of a Si Kα characteristic X-ray image of Alloy No. 14, which is one of the results of EPMA.

FIGS. 18 to 23 are, respectively, photographs obtained as results of EPMA of the alloy No. 14. FIG. 18 is a photograph of a secondary electron image and FIG. 24 diagrammatically illustrates the essential part thereof.

FIGS. 19 to 23 are, respectively, photographs of images of a Cu Lα ray, a Zn Lα ray, a Pb Mα ray, a Mn Kα ray, and a Si Kα ray. In the photographs, white portions indicate the existence of the respective elements.

Figure 24:
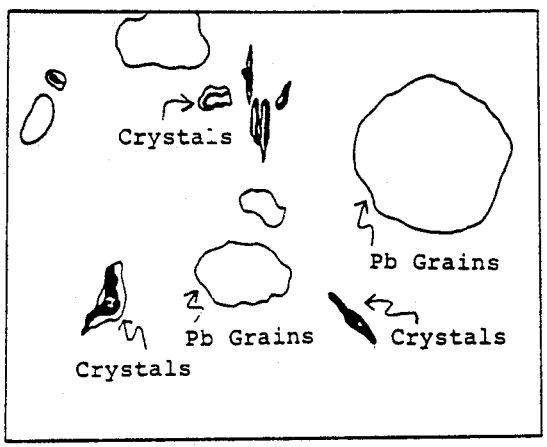
FIG. 24 is an illustrative view depicting the essential part of FIG. 18.

As will be apparent from the results of EPMA of the alloy Nos. 3 and 14, the crystals, i.e. the intermetallic compound [Mn5Si3], of the known alloy No. 14 are substantially in the form of needles as is shown in FIGS. 18 and 24. With the inventive alloy No. 13, apparently different crystals are formed, i.e. substantially spheroidal, novel intermetallic compound [Mn,Si,Co,Fe] is crystallized as shown in FIGS. 8 and 17.

The samples indicated in the attached Table 1 were processed in desired shapes and subjected to a number of tests including a wear test, a seizing test, corrosion tests including an immersion-in-hot oil test and a dezincification corrosion test, and a high temperature tensil test (300° C.) to determine a high temperature tensile strength and a high temperature elongation and a high temperature hardness test, both indicated in the attached Table 1.

1) Wear Test

Figure 25:
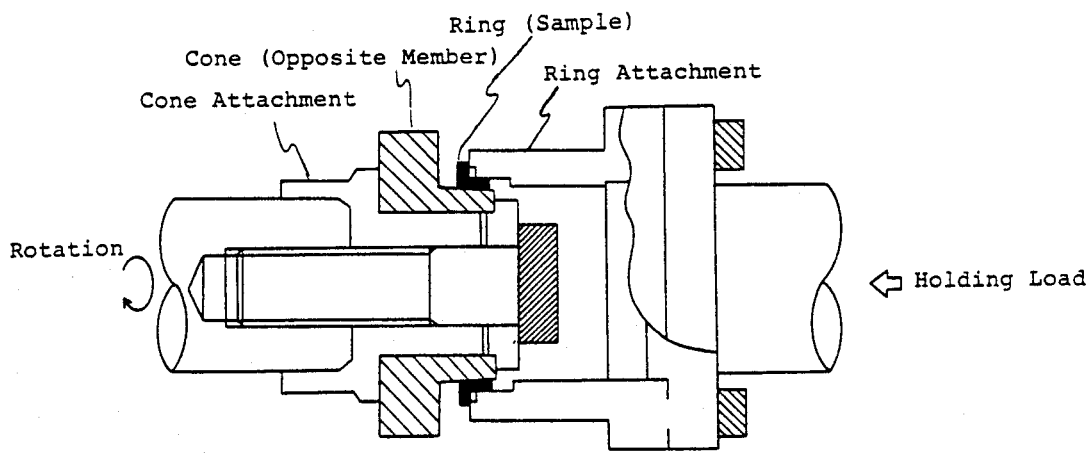
FIG. 25 is a schematic illustrative view of a wear test facility.

The inventive copper alloy Nos. 1 to 7 and the comparative copper alloy Nos. 8 to 14 were machined in the form of a ring and set in a testing device shown in FIG. 25. In the test, a ring C was held against a cone B under load under conditions indicated in Table 3. The abrasion wear was determined as a displacement of wear.

2) Seizing Test

Samples of the inventive copper alloy Nos. 1 to 7 and comparative copper alloy Nos. 8 to 14 were each applied with a load under conditions indicated in the attached Table 4 by the use of the Faville wear test facility (Falex type test machine) while increasing the load. The work done (kgf. second) which was applied to the sample until the seizing took place was measured as a Faville value.

The results of the wear and seizing tests are shown in the attached Table 5. With respect to the results of the wear test, the wear depths of the inventive alloy Nos. 1 to 7 are about ½ to ⅛ of the wear depths of the comparative alloy Nos. 8 to 14 at the holding cycles of 2000. Thus, the alloys of the invention have a very good wear resistance. At the holding cycles of 20,000, the wear depths of the inventive alloys are about ½ to 1/5 or over of those of the comparative alloys. Thus, the inventive alloys have a good wear resistance and excellent durability.

The comparison of the Faville values of the attached Table 4 reveals that the values of the copper alloy Nos. 1 to 7 of the invention are higher by about ten times than that of the comparative manganese silicide based copper alloy No. 8, thus the alloys of the invention be very excellent in the anti-seizing property. In addition, the Faville values of the alloys of the invention are substantially equal to that of a comparative lead bronze-based copper allot No. 9 which has been accepted as having a good anti-seizing property. Thus, the alloys of the invention have a very excellent anti-seizing property.

3) Corrosion Tests

(1) Immersion-in-hot oil test

Figure 26A:
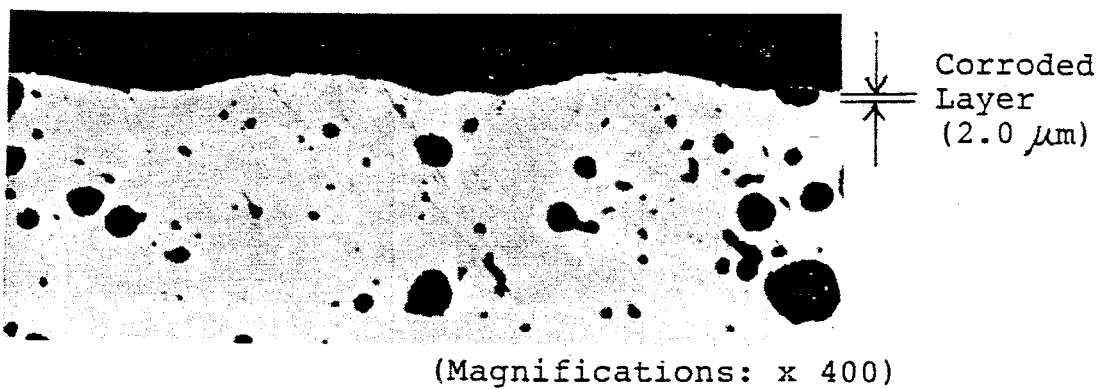
Figure 26B:
Figure 26C:
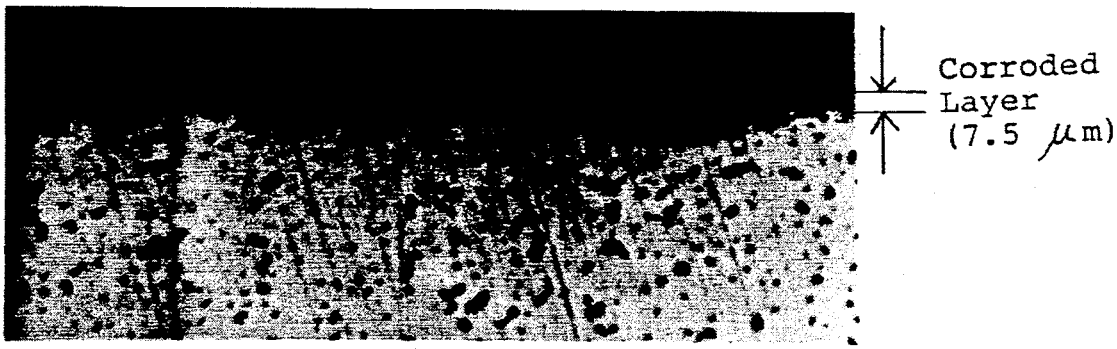

The copper alloy No. 3 of the invention and the comparative lead bronze-based copper alloy No. 9 and the manganese silicide-based copper alloy No. 14 both for comparison were each machined to provide a sample with a size of φ 10×40. Each sample was immersed in a lubricating oil (CD-15W-30) kept at 250° C. ±5° C. for 10 hours while agitating. After the immersion, the longitudinal section of the sample was mirror finished by means of a buffing machine and a photograph of the micro-structure of the section was taken (magnifications: ×400) to measure a depth of the corroded layer. The results are shown in FIGS. 26(a) to 26(c). From these figures, it will be seen that the depth of the corroded layer of the copper alloy No. 3 of the invention is about ¼ of that of the comparative lead bronze-based copper alloy No. 9 and about ½ of that of the comparative manganese silicide-based copper alloy No. 14. Thus, the alloy of the invention has a very good corrosion resistance.

(2) Dezincification corrosion test

Figure 27A:
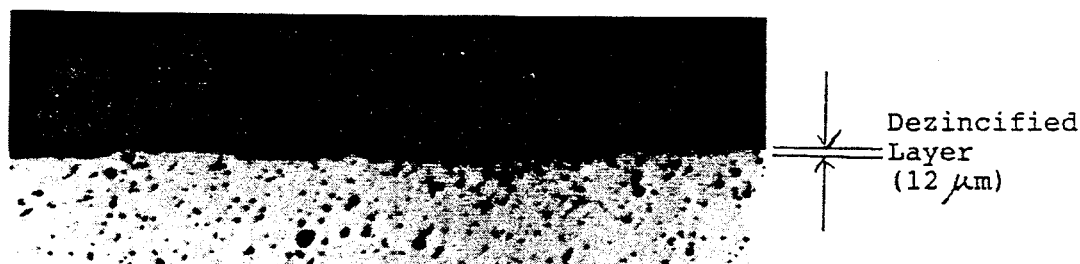
Figure 27B:
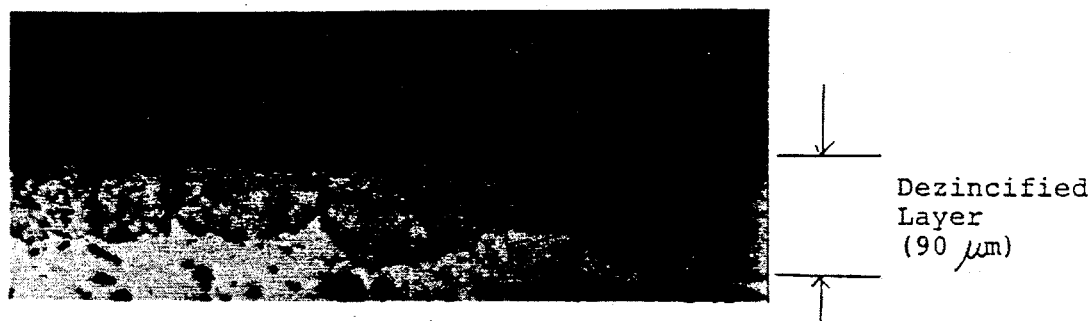
Figure 27C:
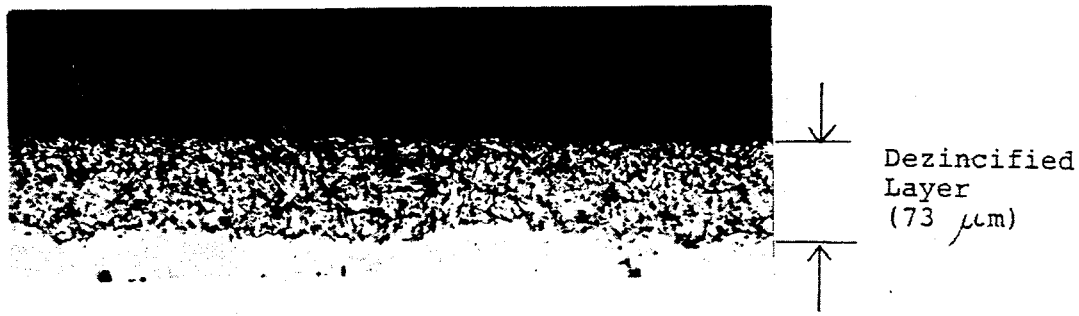

The copper alloy No. 3 of the invention and the copper alloy Nos. 8 and 14 both for comparison were provided as a test sample and subjected to a constant current anodic polarization test determined by the Corporation of Japanese Copper Center. The longitudinal section of the tested sample was mirror finished by means of a buffing machine and a photograph of the micro-structure of the section was taken (magnifications: ×200) to measure a depth of the dezincified layer. The results are shown in FIGS. 27(a) to 27(c). From these photographs, it will be seen that the comparative copper alloy Nos. 8 and 14 are considerably dezincified, whereas little dezincified phenomenon is recognized on the copper alloy No. 3 of the invention. Thus, the alloy of the invention has a very good corrosion resistance.

4) High Temperature Mechanical Properties (300° C.)

The copper alloy Nos. 1 to 7 of the invention and the copper alloy Nos. 8 to 14 for comparison were each subjected to a high temperature tensile test (high temperature tensile strength and high temperature elongation) and a high temperature Vicker's hardness test under high temperature conditions. The results are shown in the attached Table 1 as set out hereinbefore. From these results, the copper alloys of the invention are not poorer than the comparative copper alloys under high temperature conditions. In addition, the alloys of the invention are thus improved in durability such as repeated fatigue.

The results of typical evaluation tests of the alloy Nos. 3,8 and 14 are summarized in the attached Table 6. The results reveal that the copper alloys of the invention are better than the comparative copper alloys with respect to all the characteristics required for a sliding member and are improved in durability.

As will be apparent from the foregoing, the copper alloys of the invention are significantly improved over the comparative copper alloys with respect to the characteristics required for a sliding member such as a wear resistance, an anti-seizing property, a corrosion resistance and durability. When the alloys of the invention are used as sliding members or parts, which are employed under severe conditions such as of high temperatures and/or high-speed revolutions or under high load conditions or in a corrosive environment, e.g. engine parts, transmission parts, hydraulic parts and vessel parts, they exhibit very good performance.

Moreover, the results of the energy dispersed spectral analysis reveal that the intermetallic compound of the copper alloys of the invention are completely different in atomic ratios from the intermetallic compound ($Mn_5Si_3$) of the known manganese silicide-based copper alloy. The intermetallic compound of the invention is not such an intermetallic compound wherein Co and Fe are merely combined with the known intermetallic compound ($Mn_5Si_3$). More particularly, the intermetallic compound of the copper alloy of the invention consists of four elements of [Mn, Si, Co, Fe] with its atomic ratios of Mn:Si:Co:Fe ≈ 15:29:25:31.

The fineness of grains of the copper alloy according to the invention contributes not only to the improvement of the ability, but also to the uniform distribution of Pb added in large amounts. More particularly, the non-uniform distribution of Pb which will be inevitably produced owing to the difference in grain size at the time of setting is avoided because of the formation of fine grains. Pb is uniformly distributed throughout the matrix ranging from its peripheral portion to the center. Pb is added to the α phase dendrite structure in large amounts to improve the anti-seizing property. Both Fe and Co are added, by which Pb can be more uniformly dispersed to further improve the anti-seizing property. The addition of Sn ensures more uniform dispersion of Pb and an improved corrosion resistance.

TABLE 1

| Alloy No. | Composition (wt %) | | | | | | | | | High Temp. Mechanical Properties (300° C.) | | |
|---|---|---|---|---|---|---|---|---|---|---|---|---|
| | Zn | Pb | Mn | Si | Sn | Fe | Co | Al | P | Cu & inevitable impurities | Tensile (kgf/mm²) | Elongation (%) | Hardness (Hv) |
| Inventive Alloys: | | | | | | | | | | | | | |
| 1 | 15 | 9.5 | 2.5 | 1.0 | 0.5 | 0.3 | 1.0 | — | — | balance | 31 | 10 | 115 |
| 2 | 18 | 8 | 2.5 | 1.0 | 0.5 | 0.3 | 1.0 | — | — | balance | 32 | 11 | 115 |
| 3 | 20 | 8 | 2.5 | 1.0 | 0.5 | 0.3 | 0.5 | — | — | balance | 33 | 12 | 120 |
| 4 | 20 | 8 | 2.5 | 1.0 | 0.6 | 0.3 | 0.5 | — | — | balance | 33 | 12 | 120 |
| 5 | 23 | 6 | 2.5 | 1.0 | 0.6 | 0.2 | 0.5 | — | — | balance | 34 | 14 | 125 |
| 6 | 23 | 6 | 2.3 | 0.8 | 0.6 | 0.2 | 0.5 | — | — | balance | 34 | 13 | 125 |
| 7 | 23 | 7 | 2.3 | 0.8 | 0.6 | 0.2 | 0.5 | — | — | balance | 33 | 12 | 120 |
| Comparative Alloys: | | | | | | | | | | | | | |
| 8 | 35 | 0.8 | 2.3 | 1.0 | — | — | — | 1.0 | — | balance | 23 | 56 | 110 |
| 9 | — | 15 | — | — | 8 | — | — | — | 0.1 | balance | 23 | 8 | 86 |
| 10 | 20 | 8 | 2.5 | 1.0 | 0.1 | — | 2.5 | — | — | balance | 29 | 10 | 110 |
| 11 | 20 | 8 | 2.5 | 1.0 | 0.1 | 0.6 | — | — | — | balance | 28 | 10 | 110 |

TABLE 1-continued

| Alloy No. | Composition (wt %) | | | | | | | | | High Temp. Mechanical Properties (300° C.) | | |
|---|---|---|---|---|---|---|---|---|---|---|---|---|
| | Zn | Pb | Mn | Si | Sn | Fe | Co | Al | P | Cu & inevitable impurities | Tensile (kgf/mm²) | Elongation (%) | Hardness (Hv) |
| 12 | 23 | 15 | 2.0 | 1.0 | — | — | — | — | — | balance | 25 | 7 | 95 |
| 13 | 18 | 15 | 2.0 | 1.0 | — | — | — | — | — | balance | 25 | 7 | 95 |
| 14 | 20 | 6 | 2.5 | 1.0 | — | — | — | — | — | balance | 27 | 8 | 100 |

TABLE 2

Results of Qualitative Analysis of Intermetallic Compounds (Atomic %)

| No. | Alloy | Mn | Si | Fe | Co |
|---|---|---|---|---|---|
| 1 | Inventive Copper Alloy No. 3 | 14.49 | 29.30 | 25.30 | 30.91 |
| 2 | Comparative Copper Alloy No. 8 | 59.85 | 40.15 | — | — |
| 3 | Comparative Copper Alloy No. 14 | 66.41 | 33.59 | — | — |
| — | [Mn₅Si₃] Theoretical | 62.49 | 37.51 | — | — |

TABLE 3

Wear Test Conditions

| | |
|---|---|
| Holding load (kgf) | 60 |
| Revolutions (r.p.m.) | 500 |
| Holding Time (seconds) | 0.3 under load, 1.5 under load-free conditions |
| Holding Cycles | 2,000 and 20,000 |
| Lubricating oil | 5W-30 |
| Lubricating temperature (°C.) | 80 |
| Lubricating method | dipped to ½ of the diameter of the ring |
| Opposite member | SCM-420H |
| Number of Measurements (n) | 2 |

TABLE 4

Seizing Test Conditions

| | |
|---|---|
| Increase in load | An initial load of 60 Kgf was increased at a rate of 38 kgf/second |
| Revolutions (r.p.m.) | 300 (sliding speed: 0.102 m/second) |
| Lubricating oil | no lubrication |
| Opposite member | SCM415 (HRC60) U type |
| Surface roughness | sample: 2S, opposite member: 1S |
| Test time | until seizing took place |
| Number of measurements (n) | 2 |

TABLE 5

Wear Depth and Faville Value

| Alloy No. | Wear Depth (μm) | | Faville value (kgf · second) |
|---|---|---|---|
| | Holding Cycle: 2000 | Holding Cycle: 20,000 | |
| *Invention:* | | | |
| 1 | 135 | 280 | 29,500 |
| 2 | 135 | 280 | 29,300 |
| 3 | 130 | 275 | 29,000 |
| 4 | 130 | 275 | 29,300 |
| 5 | 130 | 275 | 28,000 |
| 6 | 135 | 280 | 29,000 |
| 7 | 135 | 285 | 29,000 |
| *Comparison:* | | | |
| 8 | 510 | 1,100 | 2,900 |
| 9 | 1,020 | test stopped (great depth) | 29,000 |
| 10 | 210 | 560 | 28,000 |
| 11 | 250 | 600 | 27,500 |
| 12 | 605 | 1,250 | 27,000 |
| 13 | 620 | 1,280 | 26,500 |
| 14 | 610 | 1,270 | 27,000 |

TABLE 6

Results of The Evaluation Tests

| Wear Resistance (wear depth) | Anti-seizing property (Faville value) | Corrosion Resistance | | Durability (fineness of grains) | High Temp. Mechanical property (tensile strength) | Crystals (form) |
|---|---|---|---|---|---|---|
| | | (in oil) | (in sea-water) | | | |
| *Inventive copper alloy: (Alloy No. 3 of Invention)* | | | | | | |
| ○ | ○ | ○ | ○ | ○ (fine regular system) | ○ (33 kgf/mm²) | spheroidal |
| *Lead bronze-based copper alloy: (Alloy No. 9 for comparison)* | | | | | | |
| X | 0 | X | — | X (coarse columnar system) | X (23 kgf/mm²) | not crystallized |
| *Manganese silicide-based copper alloy: (Alloy No. 14 for Comparison)* | | | | | | |
| Δ | Δ | Δ | X | X (coarse columnar system) | Δ (27 kgf/mm²) | needle-shaped |

○: excellent, Δ: good, X: poor, —: not tested

What is claimed is:

1. A Mn-Si-Co-Fe-based high-strength brass alloy consisting essentially of, on the weight basis, 15 to 25% of Zn, 1.0 to 5.0% of Mn, 0.3 to 2.0% of Si, 0.01 to 0.5% of Fe, 0.01 to 2.0% of Co, 0.2 to 1.0% of Sn, 5 to 10% of Pb and the balance being Cu and inevitable impurities wherein a substantially spheroidized intermetallic compound including Mn, Si, Co, and Fe is crystallized in the alloy and the alloy has fine grains.

2. The brass alloy according to claim 1, wherein said alloy has a grain size of 0.5 mm or below.

3. The brass alloy of claim 1 being used as a sliding member or part.

* * * * *